US009651372B1

(12) United States Patent
Lopez et al.

(10) Patent No.: US 9,651,372 B1
(45) Date of Patent: May 16, 2017

(54) PIPING LEVELING SYSTEMS

(71) Applicants: Jose Antonio Lopez, Philadelphia, PA (US); Maria Bernarda Duarte, Philadelphia, PA (US)

(72) Inventors: Jose Antonio Lopez, Philadelphia, PA (US); Maria Bernarda Duarte, Philadelphia, PA (US)

( * ) Notice: Subject to any disclaimer, the term of this patent is extended or adjusted under 35 U.S.C. 154(b) by 0 days.

(21) Appl. No.: 14/592,554

(22) Filed: Jan. 8, 2015

(51) Int. Cl.
*G01B 11/27* (2006.01)
*G01C 9/24* (2006.01)

(52) U.S. Cl.
CPC ...................... *G01C 9/24* (2013.01)

(58) Field of Classification Search
CPC .................................. B25H 7/05; G01C 9/24
USPC .......................... 33/228, 286, 1 G, 21.3, 529
See application file for complete search history.

(56) References Cited

U.S. PATENT DOCUMENTS

| | | | |
|---|---|---|---|
| 2,816,369 A | 12/1957 | Becker | |
| 5,568,265 A * | 10/1996 | Matthews | G01C 15/008 33/286 |
| 6,124,935 A * | 9/2000 | Matthews | G01B 11/27 33/286 |
| 6,286,219 B1 * | 9/2001 | Palumbo, II | G01C 15/002 33/227 |
| 6,338,203 B1 * | 1/2002 | Strickland | G01B 5/24 33/529 |
| 7,748,127 B1 * | 7/2010 | Cosimano | G01C 15/002 33/286 |
| 9,080,864 B1 * | 7/2015 | Mccarthy | G01C 15/004 |
| 2007/0068020 A1 * | 3/2007 | Adrian | B23B 49/00 33/286 |
| 2007/0204473 A1 * | 9/2007 | Dillon | B23P 19/06 33/286 |
| 2012/0115984 A1 * | 5/2012 | Pialot et al. | B29C 73/163 523/351 |
| 2012/0297635 A1 * | 11/2012 | Mickow | G01C 15/002 33/228 |
| 2014/0115907 A1 | 5/2014 | Gamon | |
| 2015/0307756 A1 * | 10/2015 | Merino Lopez et al. | B29B 7/103 523/351 |

* cited by examiner

*Primary Examiner* — G. Bradley Bennett
(74) *Attorney, Agent, or Firm* — RG Patent Consulting, LLC; Rachel Gilboy

(57) ABSTRACT

An apparatus for leveling piping systems during installation. The piping leveling assembly can also determine an exact direct of travel for future runs of pipe to complete the installation.

18 Claims, 5 Drawing Sheets

PIPING LEVELING SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of leveling means and more specifically relates to a piping leveling system.

2. Description of the Related Art

Within industry, piping is a system of pipes used to convey fluids (liquids and gases) from one location to another. Plumbing is a piping system with which most people are familiar, constituting the form of fluid transportation that is used to provide potable water and fuels to their homes and businesses. Plumbing pipes also remove waste in the form of sewage, and allow venting of sewage gases to the outdoors. Fire sprinkler systems also use piping, and may transport non-potable or potable water, or other fire-suppression fluids. Further use of piping may be found in the running of conduit along walls or in relation to locations where electricity may find use.

Conventional means of assembling these piping installations may be difficult and time-consuming for installation technicians. A cost-effective way to install piping at proper angles and to pin-point direction of travel of the piping towards a final destination is desirable.

Various attempts have been made to solve the above-mentioned problems such as those found in U.S. Pat. No. 2,816,369 to William F Becker, U.S. Pub. No. 2014/0115907 to Daniel F. Gamon. This art is representative of leveling means. None of the above inventions and patents, taken either singly or in combination, is seen to describe the invention as claimed.

Ideally, a piping leveling system should provide leveling means and project direction indication means for completing proper piping installation projects and, yet would operate reliably and be manufactured at a modest expense. Thus, a need exists for a reliable piping leveling system to avoid the above-mentioned problems.

BRIEF SUMMARY OF THE INVENTION

In view of the foregoing disadvantages inherent in the known leveling tools art, the present invention provides a novel piping leveling system. The general purpose of the present invention, which will be described subsequently in greater detail is to provide an effective and efficient means by which to level piping during installation processes.

A piping leveling system is disclosed herein, in a preferred embodiment, comprising: a piping leveling assembly comprising a connection body having lugs, and a leveling insert having a cross-array of bubble-levels, a laser pointer, a powerer (batteries or the like), and an on/off switch; wherein the piping leveling system comprises the piping leveling assembly.

The piping leveling assembly comprises in functional combination the connection body and the leveling insert; wherein the leveling insert comprises the cross-array of bubble-levels, the laser pointer, and the powerer. The laser pointer is located at an intersection of the cross-array of bubble-levels and points upwardly for use. The cross-array of bubble-levels is integrally-located; the leveling insert formed as a periphery about the cross-array of bubble-levels. The powerer (DC battery) powers the laser pointer for use. In preferred embodiments the connection body comprises PVC pipe, given its inexpensive manufacturability.

The cross-array of bubble-levels is structured and arranged to allow leveling of a piping system when the piping leveling assembly is removably coupled to the piping system, as described and shown subsequently. The cross-array of bubble-levels comprises a cross-shape; wherein the cross-array of bubble-levels comprises exactly four bubble-levels for accurate leveling.

The lugs of the connection body fit on and about an exterior of the round piping of the piping system; wherein the lugs restrict relative movement of the connection body in relation to the round piping of the piping system. In certain embodiments the lugs bias against the round piping of the piping system via spring-loaded means or alternately via induced tension within the material itself. The connection body comprises a cylindrical-profile suitable for insertion-coupling with round piping of the piping system (other shapes may be used); wherein, as such, the connection body of the piping leveling assembly is able to be removably inserted into the (cylindrical) piping system (at an open portion) to provide a guide for leveling and completing construction on the piping system. The guide for leveling and (laser for) completing construction on the piping system visually assists an operator-user to help determine a path for future assembling of the piping system.

A kit is also described herein including: a plurality of the piping leveling assembl(ies) available in different diameters (for use with different sized piping), and a set of user-instructions.

A method of using a piping leveling system is also disclosed herein comprising the steps of: activating a laser pointer of a piping leveling assembly (via an on/off switch or the like), removably-coupling the piping leveling assembly to a piping system, and determining a 'future run' (travel direction for installation) of the piping system. The method may further comprise the step of leveling existing piping of the piping system using the cross-array of bubble-levels.

The present invention holds significant improvements and serves as a piping leveling system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, piping leveling system, constructed and operative according to the teachings of the present invention.

The various embodiments of the present invention will hereinafter be described in conjunction with the appended drawings, wherein like designations denote like elements.

DETAILED DESCRIPTION

Figure 1:
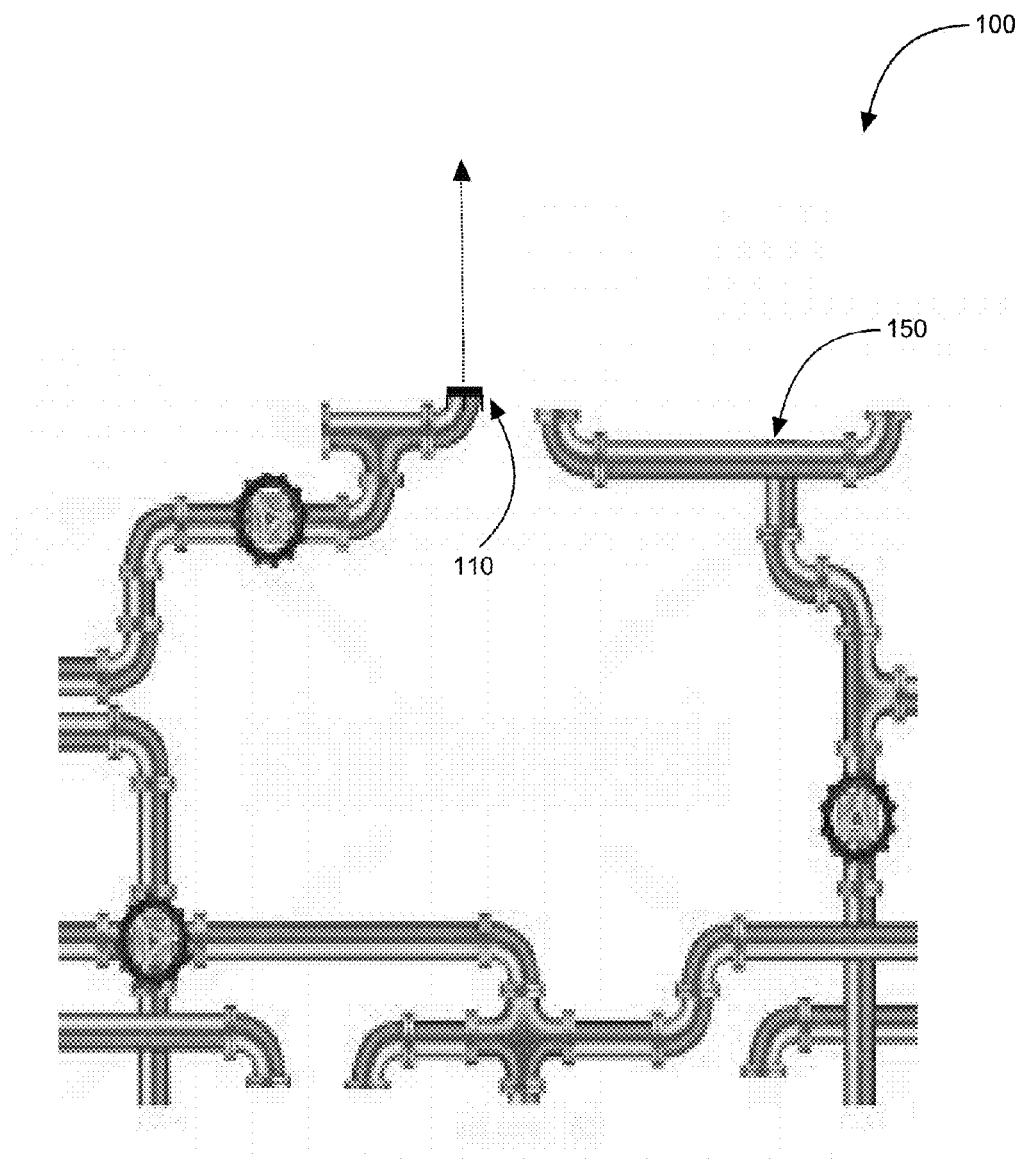
FIG. 1 shows a perspective view illustrating a piping leveling system in an in-use condition according to an embodiment of the present invention.
Figure 2:
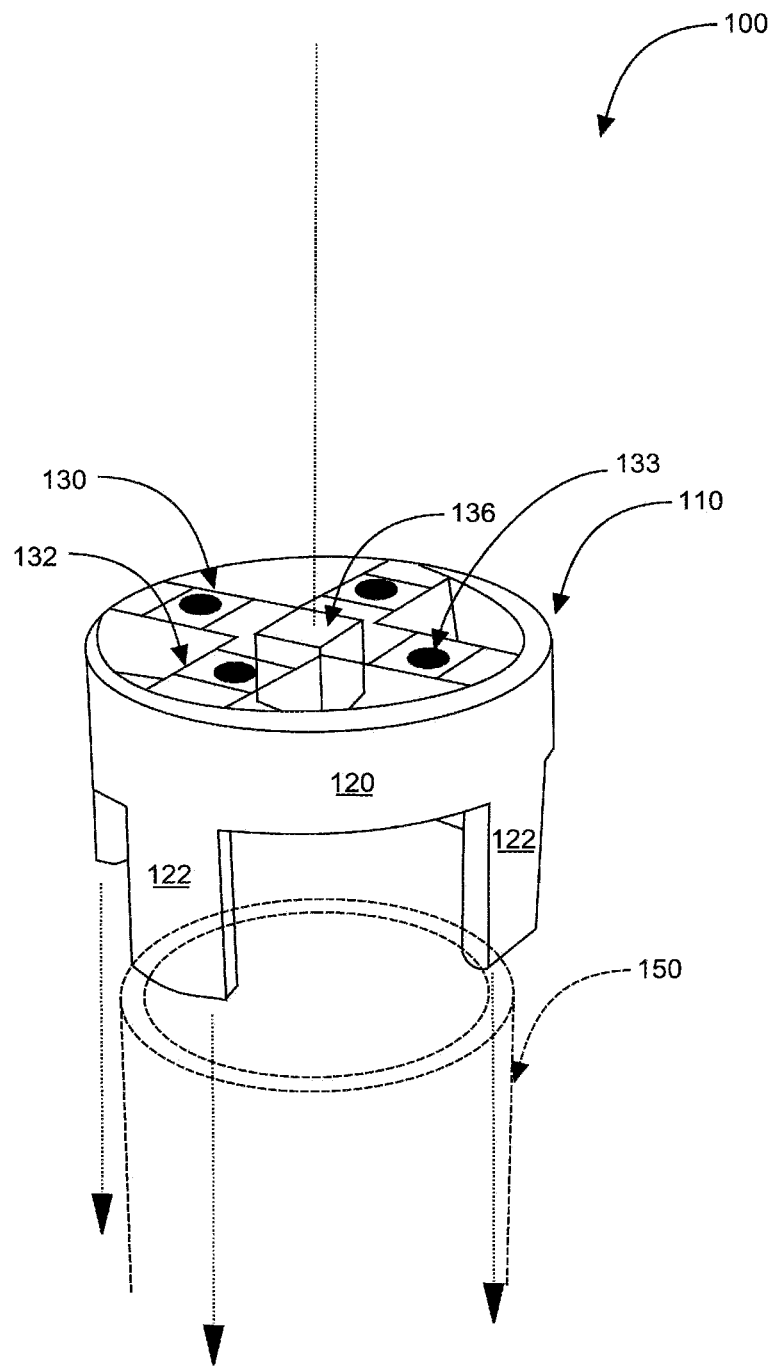
FIG. 2 is a perspective view illustrating a piping leveling assembly of the piping leveling system according to an embodiment of the present invention of FIG. 1.
Figure 3:
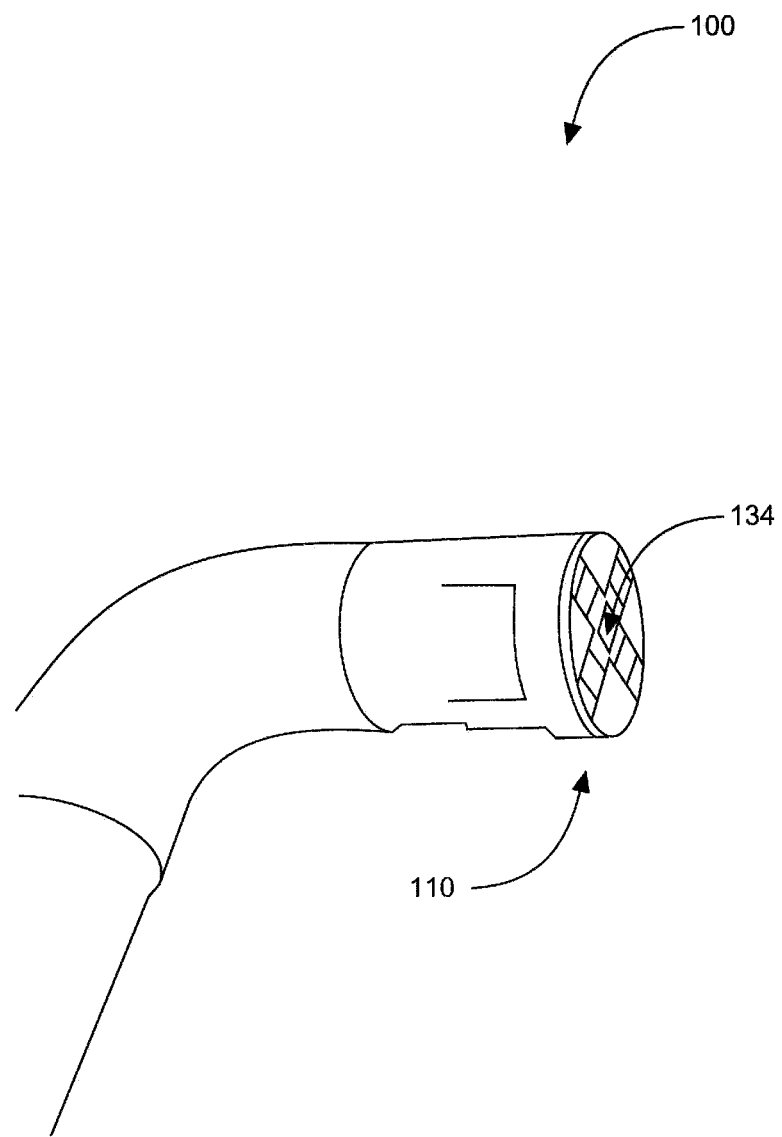
FIG. 3 is a perspective view illustrating the piping leveling assembly according to an embodiment of the present invention of FIG. 1.
Figure 4:
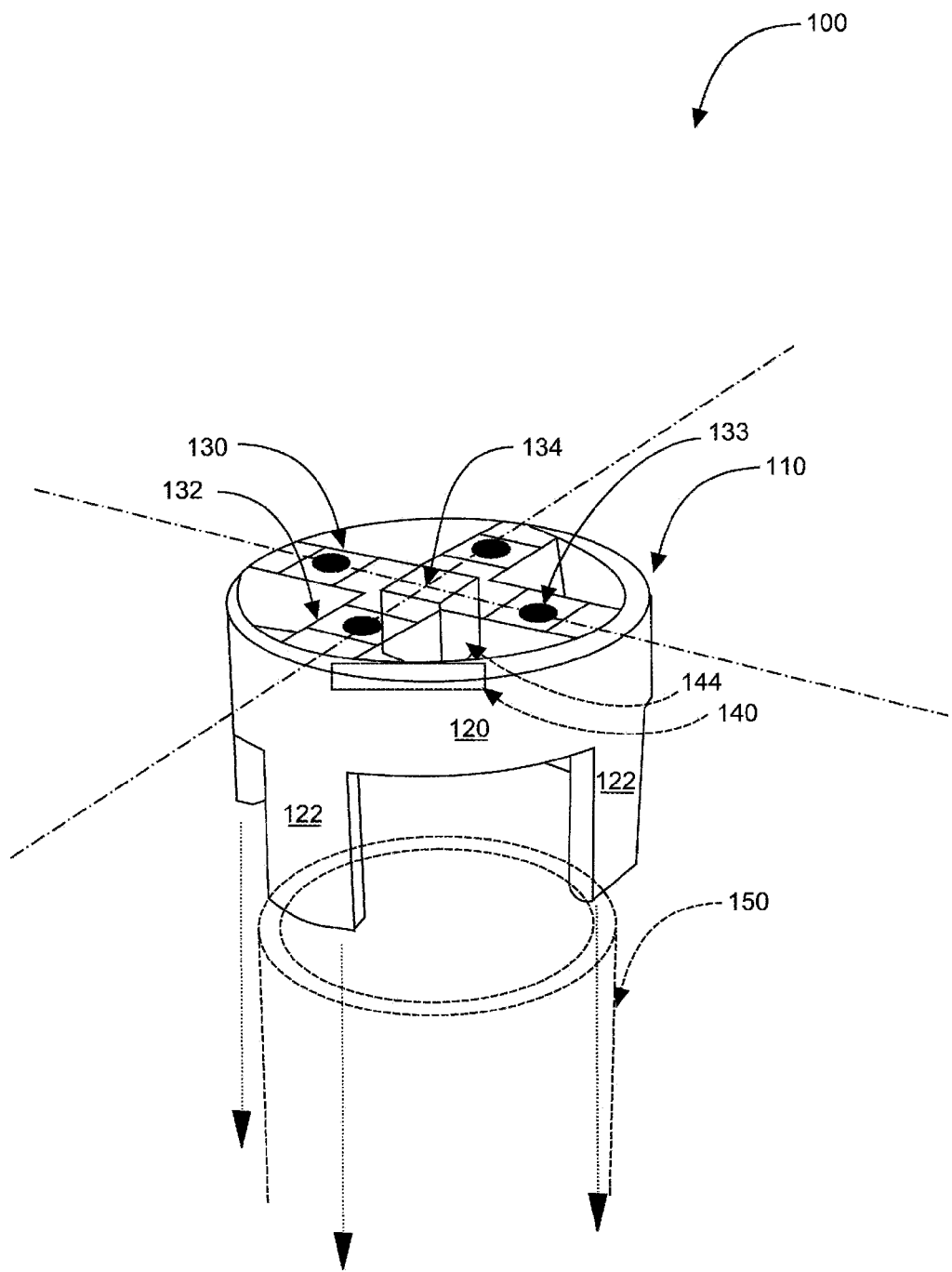
FIG. 4 is a perspective view illustrating the piping leveling assembly according to an embodiment of the present invention of FIG. 1.

As discussed above, embodiments of the present invention relate to a levelers and more particularly to a piping leveling system as used to improve the efficiency of piping installation processes.

Referring to the drawings by numerals of reference there is shown in FIGS. 1-4, various views of piping leveling system 100 comprising: piping leveling assembly 110 comprising connection body 120, and leveling insert 130 having a cross-array of bubble-levels 132, laser pointer 136, and a powerer 140 (powering means such as a battery or the like); wherein piping leveling system 100 comprises piping leveling assembly 110. Piping leveling assembly 110 comprises in functional combination connection body 120 and leveling insert 130; the present invention may be offered in sizes of 1½ inches in height and various sized diameters. Connection body 120 preferably comprises PVC pipe. Upon reading this specification, it should be appreciated that, under appropriate circumstances, considering such issues as user preferences, design preference, structural requirements, marketing preferences, cost, available materials, technological advances, etc., other material arrangements such as, for example, non-plastics, other plastics, ferrous and non-ferrous materials and composites, etc., may be sufficient.

Referring now to leveling insert 130; leveling insert 130 comprises cross-array of bubble-levels 132, laser pointer 136, and powerer 140; wherein laser pointer 136 is located at an intersection 134 of cross-array of bubble-levels 132 and points upwardly for use, as shown. Cross-array of bubble-levels 132 is integrally-located; leveling insert 130 formed as a periphery about cross-array of bubble-levels 132. Powerer 140 powers laser pointer 136 for use, as shown in FIG. 1. Cross-array of bubble-levels 132 is structured and arranged to allow leveling of a piping system 150 when piping leveling assembly 110 is removably coupled to the piping system 150.

Connection body 120 of piping leveling assembly 110 is able to be removably inserted into piping system 150 (at an open/unfinished portion) to provide a guide (guiding means) for leveling and completing construction on piping system 150. Connection body 120 comprises a cylindrical-profile suitable for insertion-coupling with round piping of piping system 150. Connection body 120 further comprises lugs 122 in preferred embodiments, as shown. Lugs 122 fit on an exterior of the round piping of piping system 150. Lugs 122 restrict relative movement of connection body 120 in relation to the round piping of piping system 150. Lugs 122 may bias against the round piping of piping system 150. In alternate embodiments lugs 122 may further comprise spring-loading means. Cross-array of bubble-levels 132 comprises a cross-shape, as shown; wherein cross-array of bubble-levels 132 comprises exactly four bubble-levels 133. Piping leveling system 100 as such provides the guide for leveling and completing construction on piping system 150 visually assists an operator-user to determine a 'path' for future assembling of piping system 150.

Piping leveling system 100 may further comprise an on/off switch 144 to control laser pointer 136 between on and off conditions, respectively; laser pointer 136 is located along a centerline of the round piping. Laser pointer 136 comprises a focused light that is able to be aimed to indicate a drill-point. Piping system 150 as discussed herein may comprise for example a plumbing-assembly or an electrical-installation-assembly.

Piping leveling system 100 may be sold as a kit comprising the following parts: a plurality of the piping leveling assembl(ies) 110; and at least one set of user instructions. The kit has instructions such that functional relationships are detailed in relation to the structure of the invention (such that the invention can be used, maintained, or the like in a preferred manner). Piping leveling system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
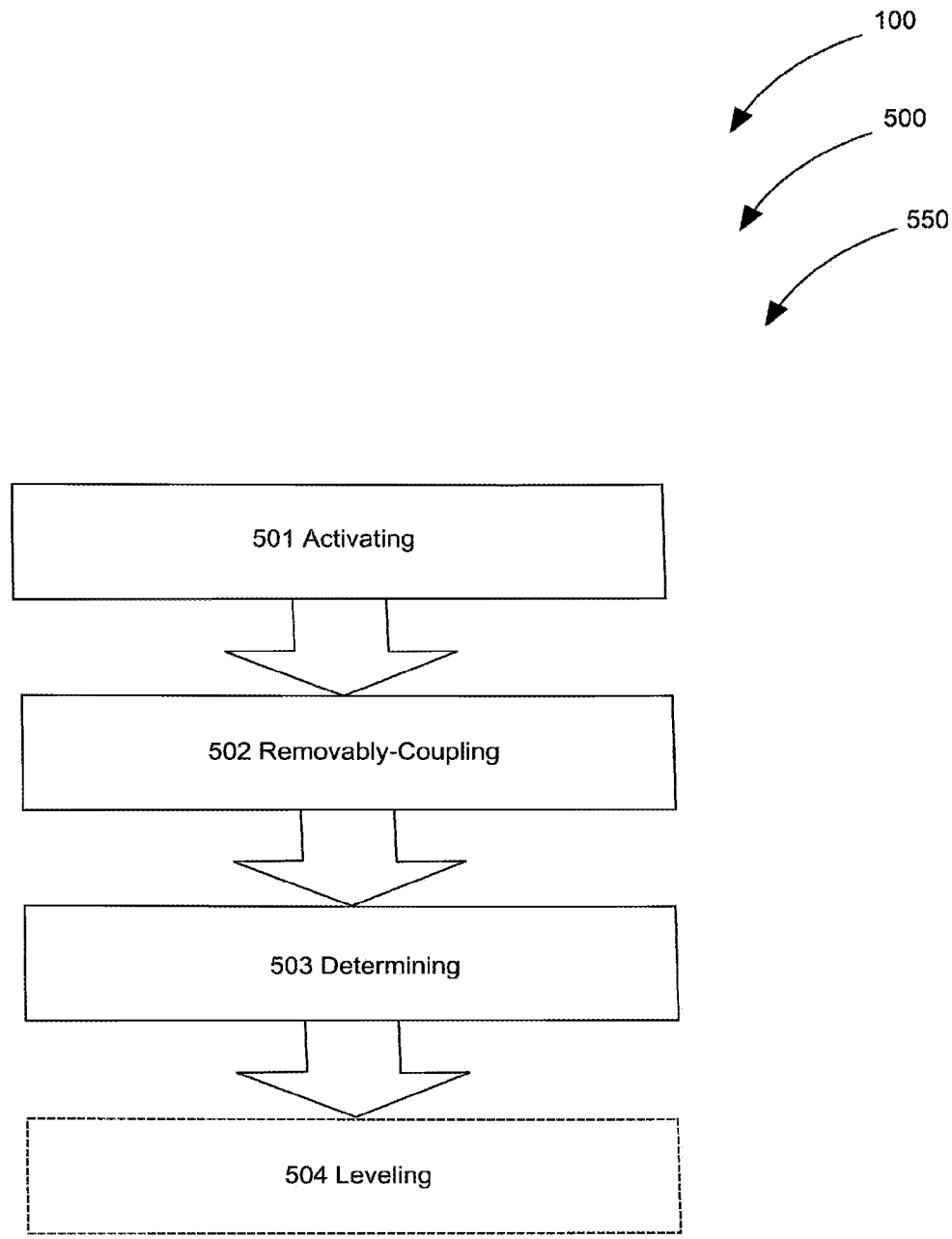
FIG. 5 is a flowchart illustrating a method of use for the piping leveling system according to an embodiment of the present invention of FIGS. 1-4.

Referring now to FIG. 5, a flowchart illustrating a method of use 500 for piping leveling system 100 according to an embodiment of the present invention of FIGS. 1-4.

A method of using (method of use 500) piping leveling system 100 comprises the steps of: step one 501 activating laser pointer 136 of piping leveling assembly 110 (via an on/off switch 144 or the like), step two 502 removably-coupling piping leveling assembly 110 to piping system 150, and step three 503 determining a 'future run' (travel direction for installation) of piping system 150. The method 500 may further comprise the step four 504 of leveling existing piping of piping system 150 using cross-array of bubble-levels 132.

It should be noted that step 504 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A piping leveling system comprising:
   a piping leveling assembly comprising;
      a connection body; and
      a leveling insert having;
         a cross-array of bubble-levels;
         a laser pointer; and
         a powerer;
   wherein said piping leveling system comprises said piping leveling assembly;
   wherein said piping leveling assembly comprises in functional combination said connection body and said leveling insert;
   wherein said leveling insert comprises said cross-array of bubble-levels, said laser pointer, and said powerer;
   wherein said laser pointer is located at an intersection of said cross-array of bubble-levels and points upwardly for use;
   wherein said cross-array of bubble-levels is integrally-located, said leveling insert formed as a periphery about said cross-array of bubble-levels;
   wherein said powerer powers said laser pointer for said use;
   wherein said cross-array of bubble-levels is structured and arranged to allow leveling of a piping system when said piping leveling assembly is removably coupled to said piping system; and
   wherein said connection body of said piping leveling assembly is able to be removably inserted into said piping system to provide a guide for leveling and completing construction on said piping system.

2. The piping leveling system of claim 1 wherein said connection body comprises a cylindrical-profile suitable for insertion-coupling with round piping of said piping system.

3. The piping leveling system of claim 2 wherein said connection body further comprises lugs.

4. The piping leveling system of claim 3 wherein said lugs fit on an exterior of said round piping of said piping system.

5. The piping leveling system of claim 4 wherein said lugs restrict relative movement of said connection body in relation to said round piping of said piping system.

6. The piping leveling system of claim 5 wherein said lugs bias against said round piping of said piping system.

7. The piping leveling system of claim 5 wherein said lugs further comprise spring-loading means.

8. The piping leveling system of claim 1 wherein said cross-array of bubble-levels comprises a cross-shape.

9. The piping leveling system of claim 8 wherein said cross-array of bubble-levels comprises exactly four bubble-levels.

10. The piping leveling system of claim 1 wherein said guide for leveling and completing construction on said piping system visually assists an operator-user to determine a path for future assembling of said piping system.

11. The piping leveling system of claim 1 further comprises an on/off switch to control said laser pointer between on and off conditions, respectively.

12. The piping leveling system of claim 1 wherein said laser pointer is located along a centerline of said round piping.

13. The piping leveling system of claim 10 wherein said piping system comprises a plumbing-assembly.

14. The piping leveling system of claim 10 wherein said piping system comprises a electrical-installation-assembly.

15. The piping leveling system of claim 1 wherein said laser pointer comprises a focused light that is able to be aimed to indicate a drill-point.

16. The piping leveling system of claim 1 wherein said connection body comprises pvc pipe.

17. A piping leveling system comprising:
   a piping leveling assembly comprising;
      a connection body having lugs; and
      a leveling insert having;
         a cross-array of bubble-levels;
         a laser pointer;
         a powerer; and
         an on/off switch;
   wherein said piping leveling system comprises said piping leveling assembly;
   wherein said piping leveling assembly comprises in functional combination said connection body and said leveling insert;
   wherein said leveling insert comprises said cross-array of bubble-levels, said laser pointer, and said powerer;
   wherein said laser pointer is located at an intersection of said cross-array of bubble-levels and points upwardly for use;
   wherein said cross-array of bubble-levels is integrally-located, said leveling insert formed as a periphery about said cross-array of bubble-levels;
   wherein said powerer powers said laser pointer for said use;
   wherein said connection body comprises pvc pipe;
   wherein said cross-array of bubble-levels is structured and arranged to allow leveling of a piping system when said piping leveling assembly is removably coupled to said piping system;
   wherein said cross-array of bubble-levels comprises a cross-shape;
   wherein said cross-array of bubble-levels comprises exactly four bubble-levels;
   wherein said lugs of said connection body fit on and about an exterior of said round piping of said piping system;
   wherein said lugs restrict relative movement of said connection body in relation to said round piping of said piping system;
   wherein said lugs bias against said round piping of said piping system;
   wherein said connection body comprises a cylindrical-profile suitable for insertion-coupling with round piping of said piping system;
   wherein said connection body of said piping leveling assembly is able to be removably inserted into said piping system to provide a guide for leveling and completing construction on said piping system; and wherein said guide for leveling and completing construction on said piping system visually assists an operator-user to determine a path for future assembling of said piping system.

18. The piping leveling system of claim 17 further comprising a kit including:
a plurality of said piping leveling assembl(ies) in different diameters; and
a set of user-instructions.

* * * * *